United States Patent
Yang et al.

(10) Patent No.: US 9,781,561 B2
(45) Date of Patent: Oct. 3, 2017

(54) METHOD AND APPARATUS FOR CALCULATING LOCATION OF ELECTRONIC DEVICE

(71) Applicant: LG ELECTRONICS INC., Seoul (KR)

(72) Inventors: Seungryul Yang, Seoul (KR); Minsoo Lee, Seoul (KR); Jangwoong Park, Seoul (KR); Jingu Choi, Seoul (KR); Younghwan Kwon, Seoul (KR); Jaeho Lee, Seoul (KR); Hyeonjae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/905,405

(22) PCT Filed: Jul. 3, 2014

(86) PCT No.: PCT/KR2014/005933
§ 371 (c)(1),
(2) Date: Jan. 15, 2016

(87) PCT Pub. No.: WO2015/008953
PCT Pub. Date: Jan. 22, 2015

(65) Prior Publication Data
US 2016/0165397 A1 Jun. 9, 2016

Related U.S. Application Data

(60) Provisional application No. 61/856,002, filed on Jul. 18, 2013, provisional application No. 61/856,068, filed on Jul. 19, 2013.

(51) Int. Cl.
H04W 4/02 (2009.01)
H04W 64/00 (2009.01)
(Continued)

(52) U.S. Cl.
CPC ............... *H04W 4/023* (2013.01); *G01S 5/12* (2013.01); *G01S 13/765* (2013.01);
(Continued)

(58) Field of Classification Search
CPC ....... G01S 13/765; G01S 5/12; H04B 17/318; H04W 4/023; H04W 64/00; H04W 84/20
See application file for complete search history.

(56) References Cited

U.S. PATENT DOCUMENTS

| | | | |
|---|---|---|---|
| 2003/0013472 A1* | 1/2003 | Miklos | H04W 48/12 455/517 |
| 2006/0092907 A1* | 5/2006 | Shimokawa | H04W 72/10 370/347 |

(Continued)

FOREIGN PATENT DOCUMENTS

| | | |
|---|---|---|
| EP | 2 474 834 A2 | 7/2012 |
| JP | 2007-505588 A | 3/2007 |

(Continued)

OTHER PUBLICATIONS

Korean Office Action dated Oct. 13, 2016, in corresponding Korean Patent Application No. 10-2016-7000421.

(Continued)

*Primary Examiner* — Kashif Siddiqui
(74) *Attorney, Agent, or Firm* — Morgan, Lewis & Bockius LLP

(57) ABSTRACT

The present invention relates to a method and apparatus of calculating a location of an electronic device. The present invention comprises receiving a common packet from a host device, the common packet containing at least any one of frequency-related information or information on a time when a data packet is transmitted; receiving the data packet based on the information contained in the common packet, the data packet containing at least any one of location-
(Continued)

related information or antenna-related information of the host device; obtaining angle information indicating a location relation with the host device using at least any one of the location-related information or the antenna-related information of the received data packet; and calculating the location of the electronic device based on the angle information.

11 Claims, 16 Drawing Sheets

(51) Int. Cl.
  *H04B 17/318* (2015.01)
  *G01S 5/12* (2006.01)
  *G01S 13/76* (2006.01)
  *H04W 84/20* (2009.01)

(52) U.S. Cl.
  CPC .......... *H04B 17/318* (2015.01); *H04W 64/00* (2013.01); *H04W 84/20* (2013.01)

(56) References Cited

U.S. PATENT DOCUMENTS

| | | | | |
|---|---|---|---|---|
| 2007/0178911 | A1* | 8/2007 | Baumeister | G01S 1/022 455/456.1 |
| 2007/0274240 | A1 | 11/2007 | Weidenhaupt et al. | |
| 2008/0057966 | A1* | 3/2008 | Kwon | H04H 20/57 455/446 |
| 2009/0061898 | A1 | 3/2009 | Johnson et al. | |
| 2009/0088183 | A1* | 4/2009 | Piersol | G01C 21/206 455/456.1 |
| 2009/0325598 | A1 | 12/2009 | Guigne et al. | |
| 2010/0046585 | A1* | 2/2010 | So | H04B 1/7156 375/134 |
| 2010/0135178 | A1 | 6/2010 | Aggarwal et al. | |
| 2012/0178471 | A1* | 7/2012 | Kainulainen | G01S 5/0009 455/456.1 |
| 2012/0249300 | A1* | 10/2012 | Avital | H04W 64/00 340/8.1 |
| 2012/0295654 | A1 | 11/2012 | Sridhara et al. | |
| 2013/0166140 | A1 | 6/2013 | Steiner | |
| 2014/0004882 | A1 | 1/2014 | Johnson et al. | |
| 2014/0378058 | A1* | 12/2014 | Decuir | H04W 4/008 455/41.2 |

FOREIGN PATENT DOCUMENTS

| | | |
|---|---|---|
| JP | 2008-501974 A | 1/2008 |
| KR | 10-2001-0110066 A | 12/2001 |
| WO | 00/75684 A1 | 12/2000 |
| WO | 2005/121829 A1 | 12/2005 |
| WO | 2009/026186 A2 | 2/2009 |
| WO | 2012/158229 A1 | 11/2012 |

OTHER PUBLICATIONS

International Search Report dated Oct. 29, 2014, for International application No. PCT/KR2014/005933.

Extended European Search Report dated Dec. 8, 2016, in corresponding European Patent Application No. 14827049.9.

Japanese Office Action in corresponding Japanese Patent Application No. 2016-527912 dated Jan. 10, 2017.

* cited by examiner

[Figure 1]
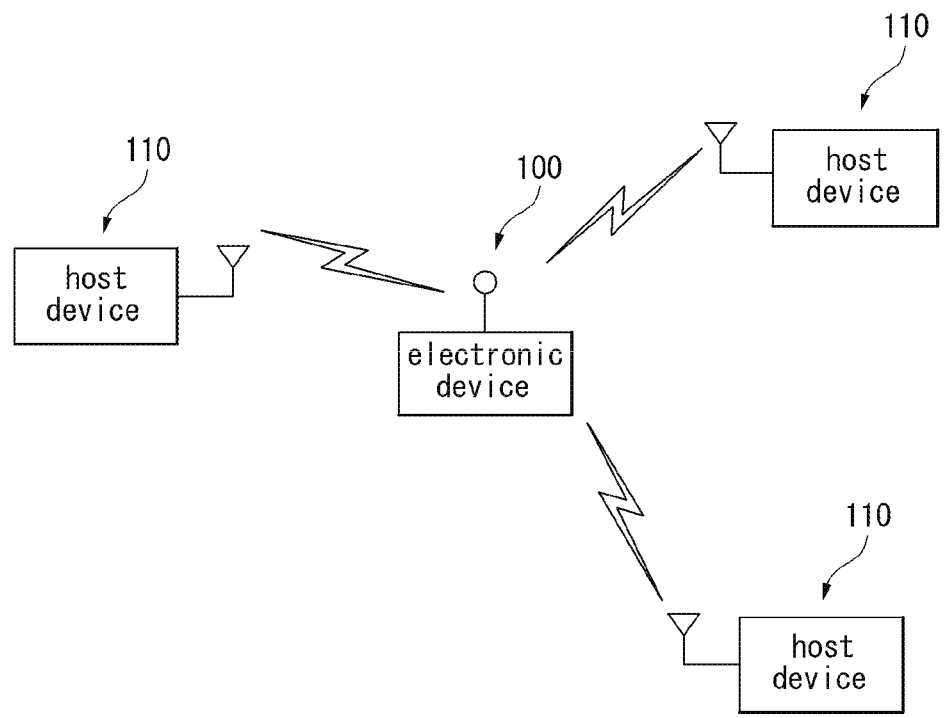
[Figure 2]
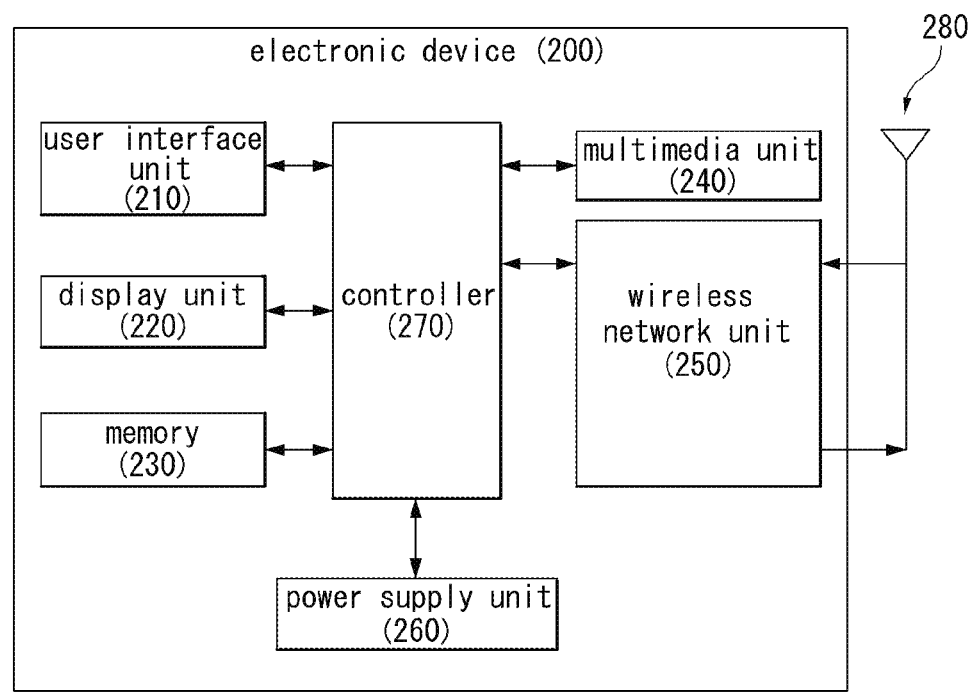

[Figure 3]
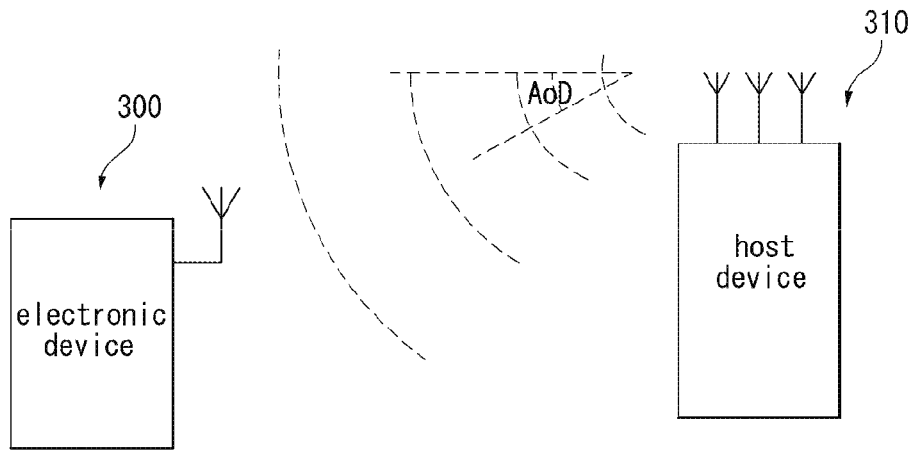
[Figure 4]
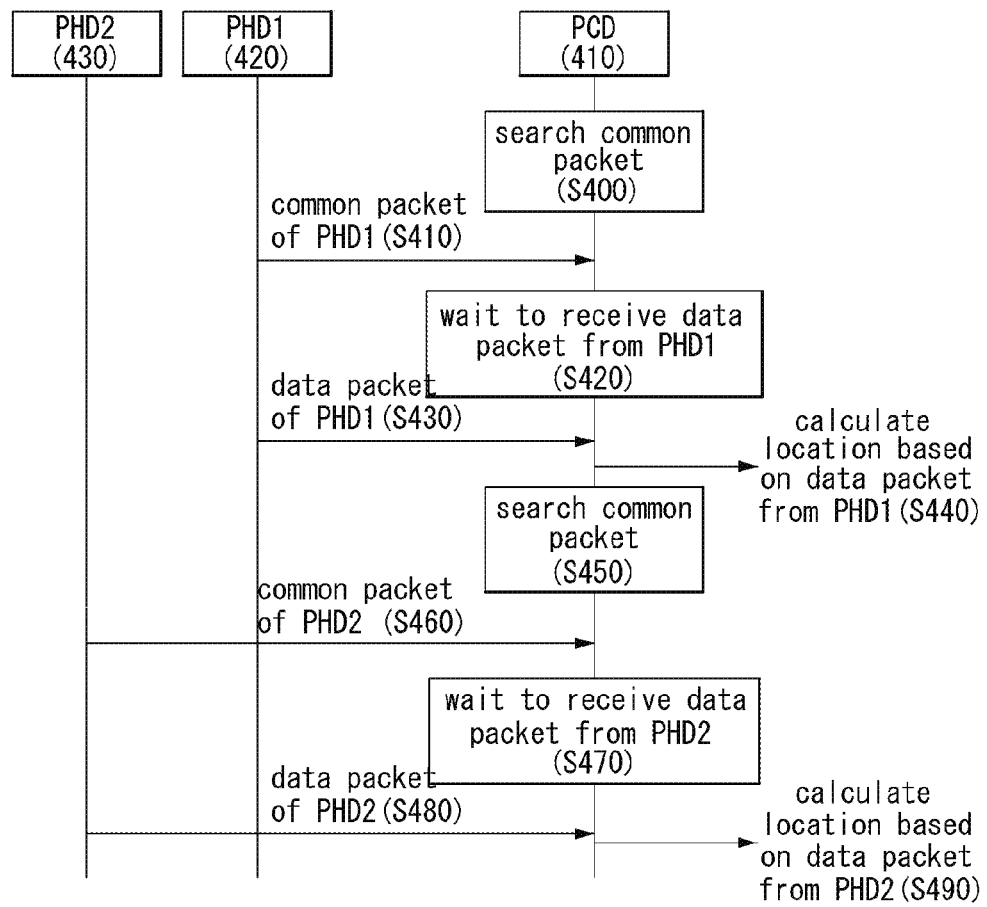

[Figure 5]
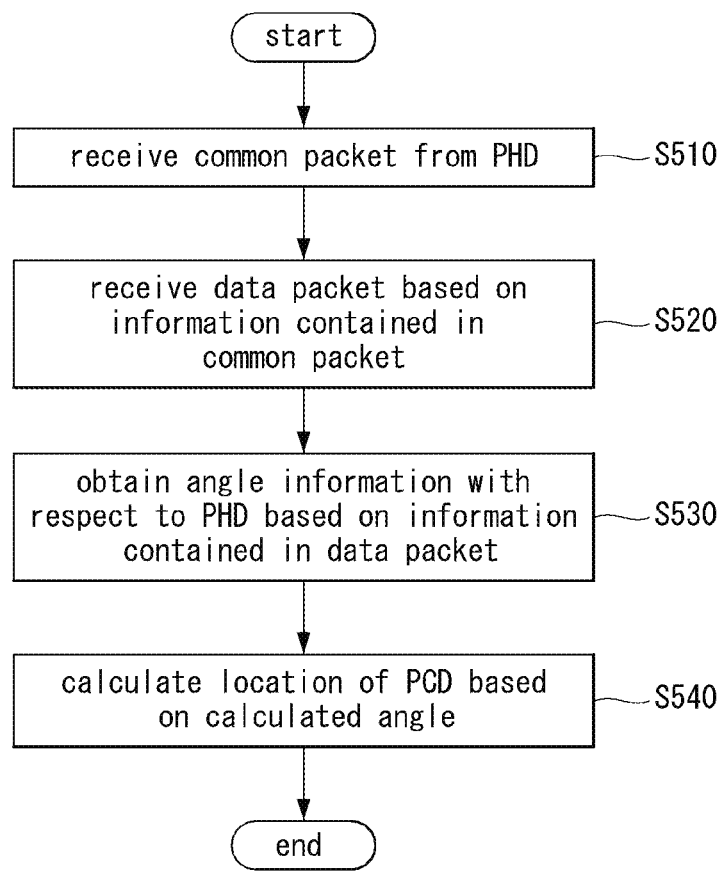

[Figure 6]
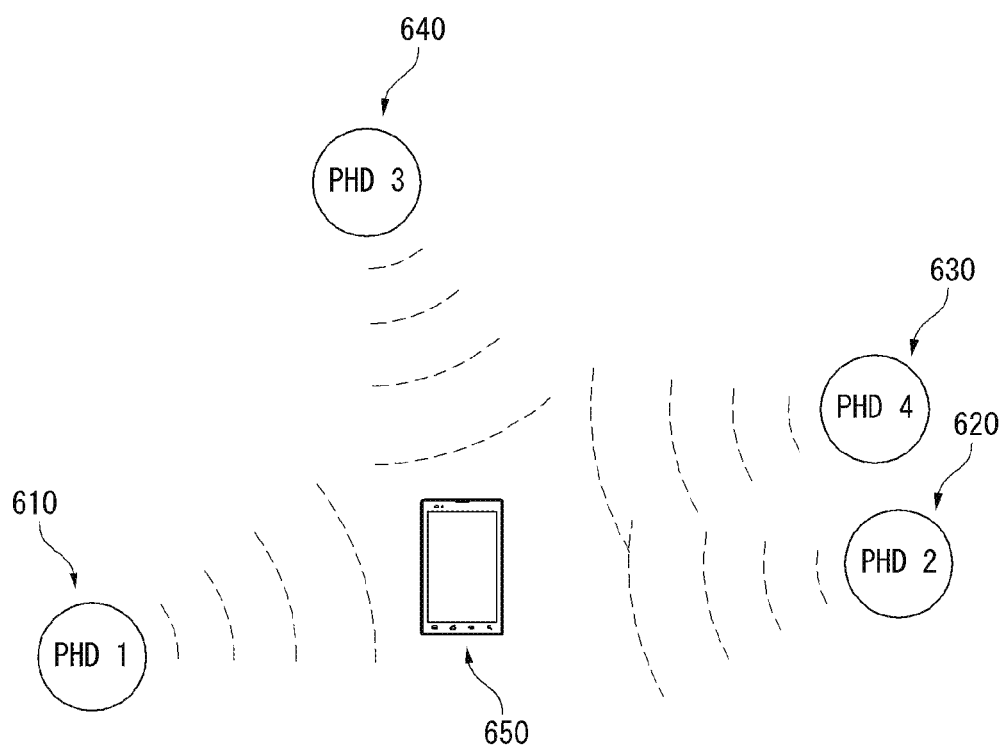

[Figure 7]
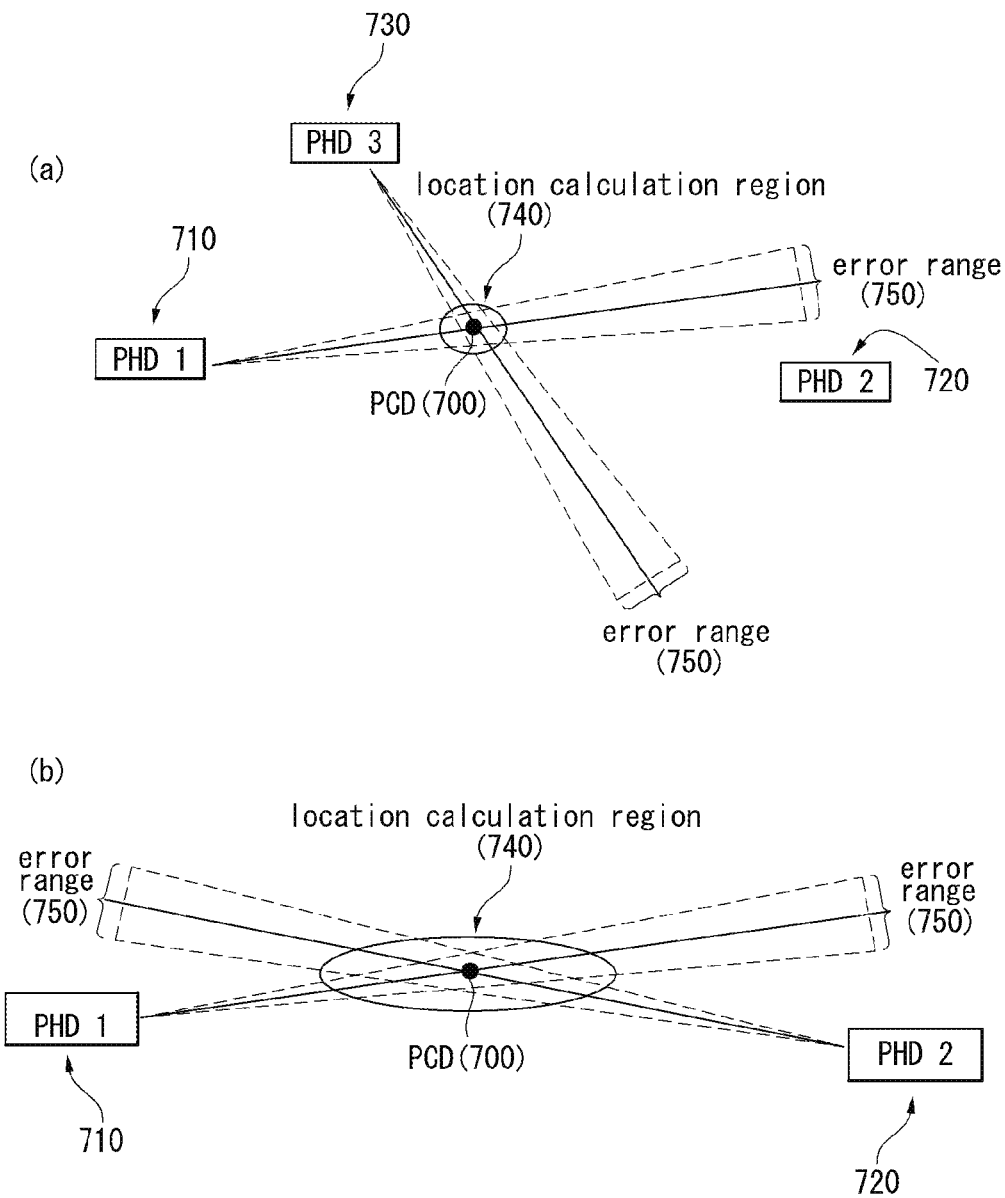

[Figure 8]
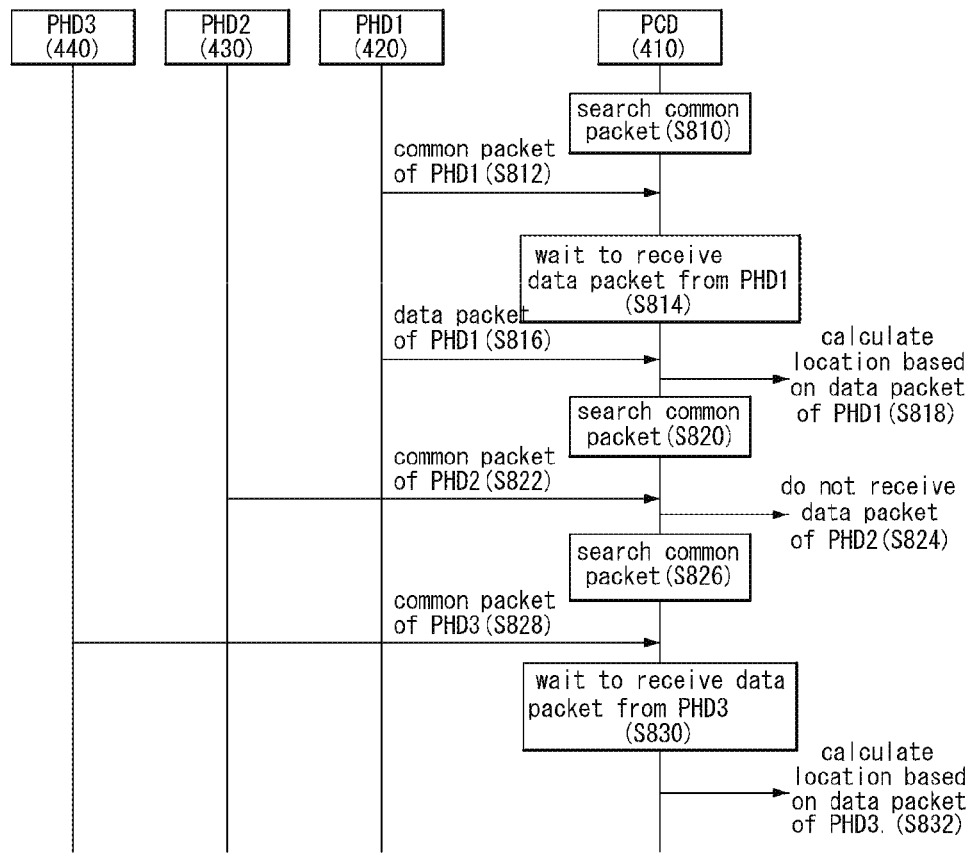
[Figure 9]
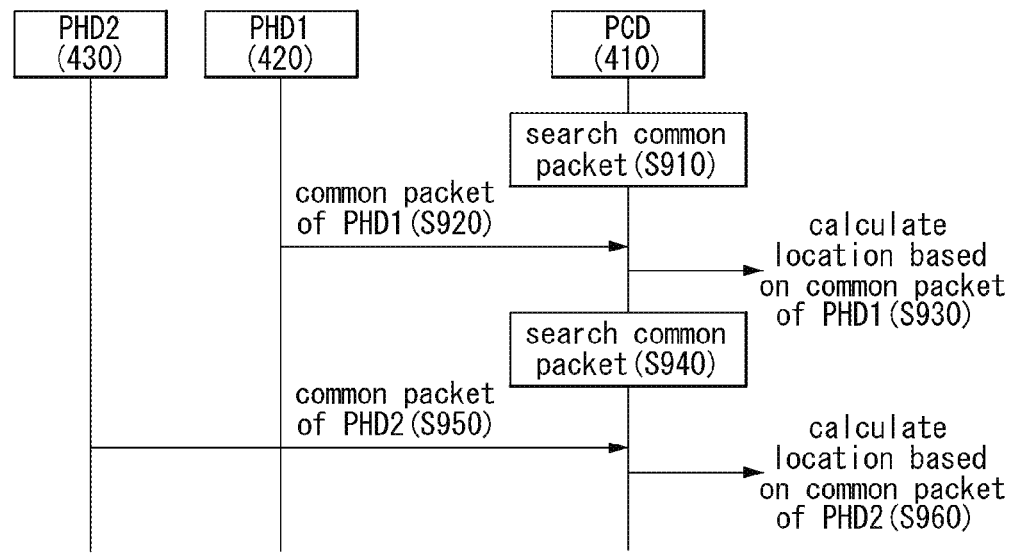

[Figure 10]
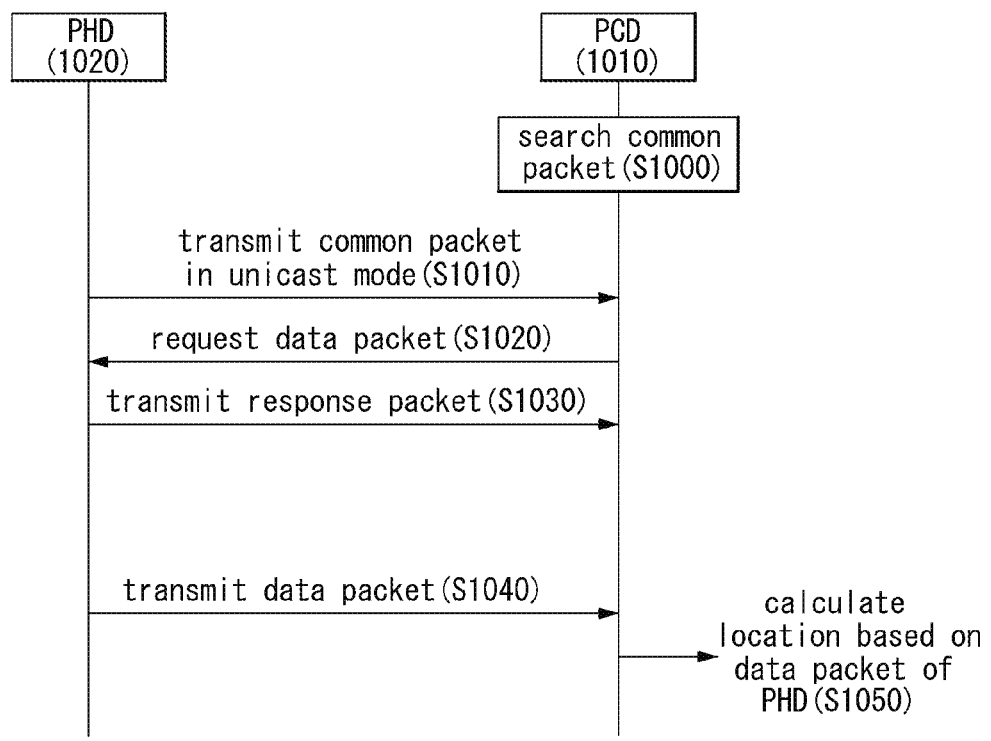

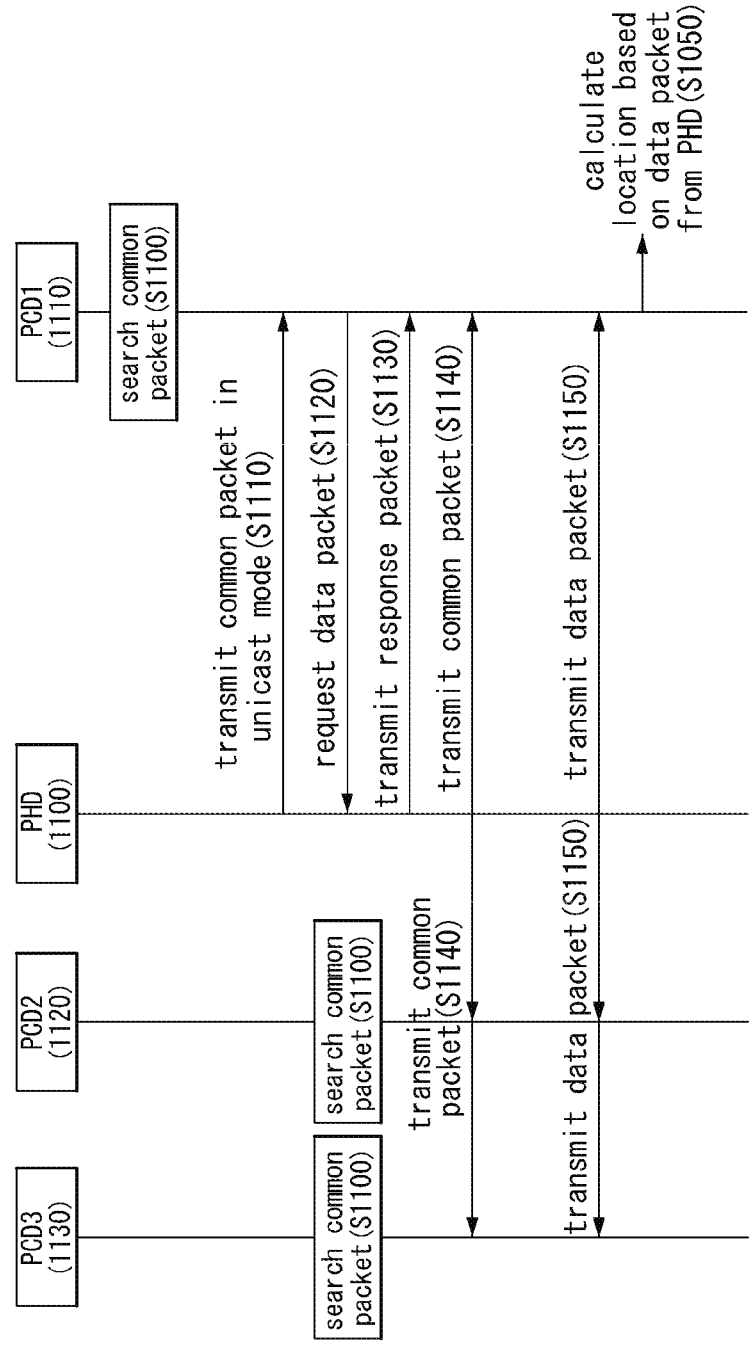

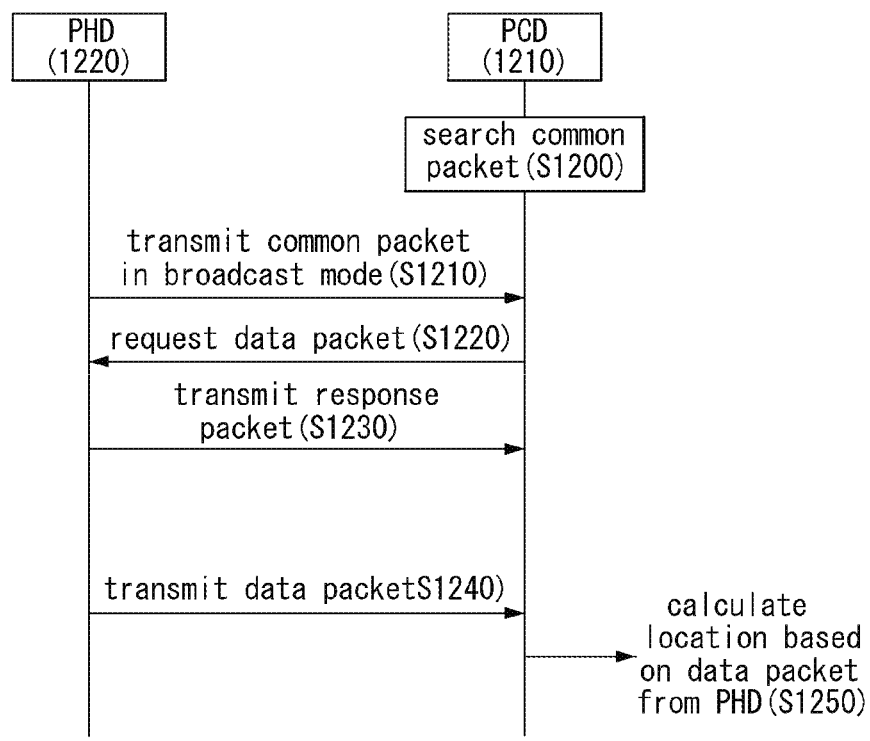
[Figure 12]

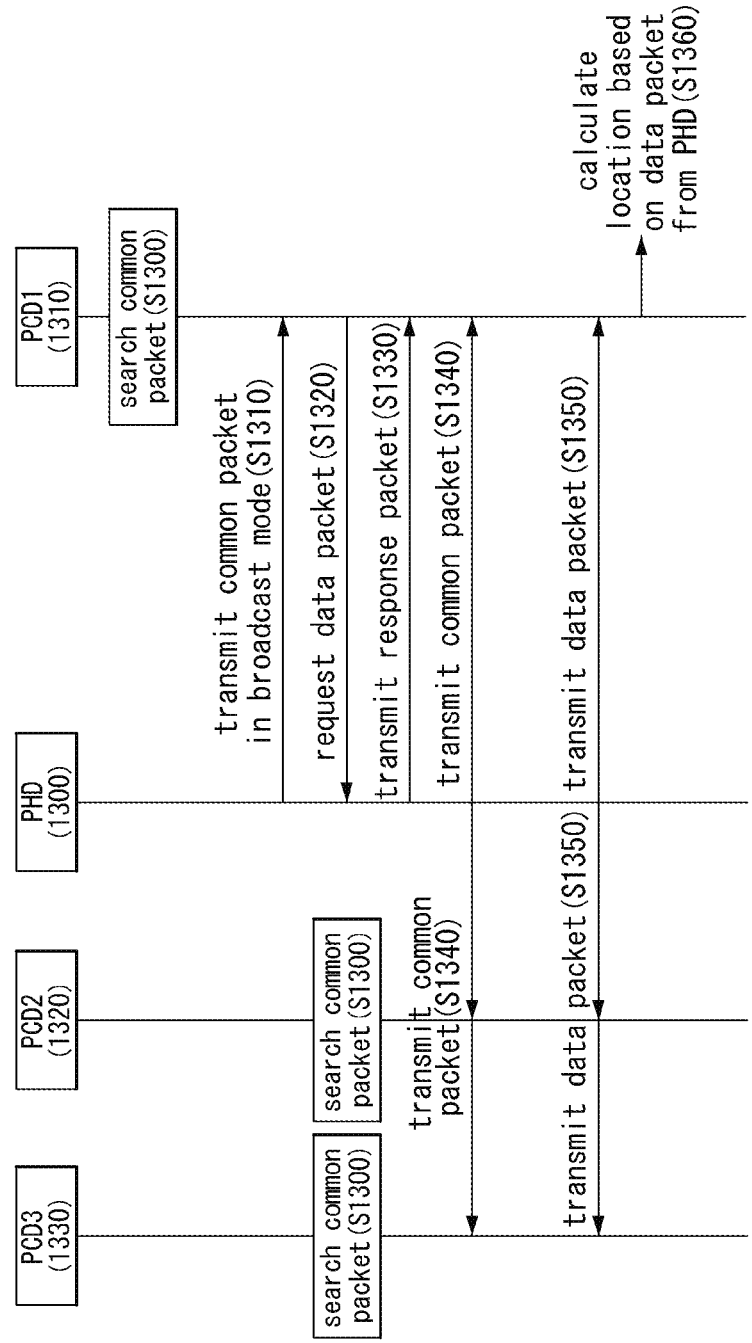
[Figure 13]

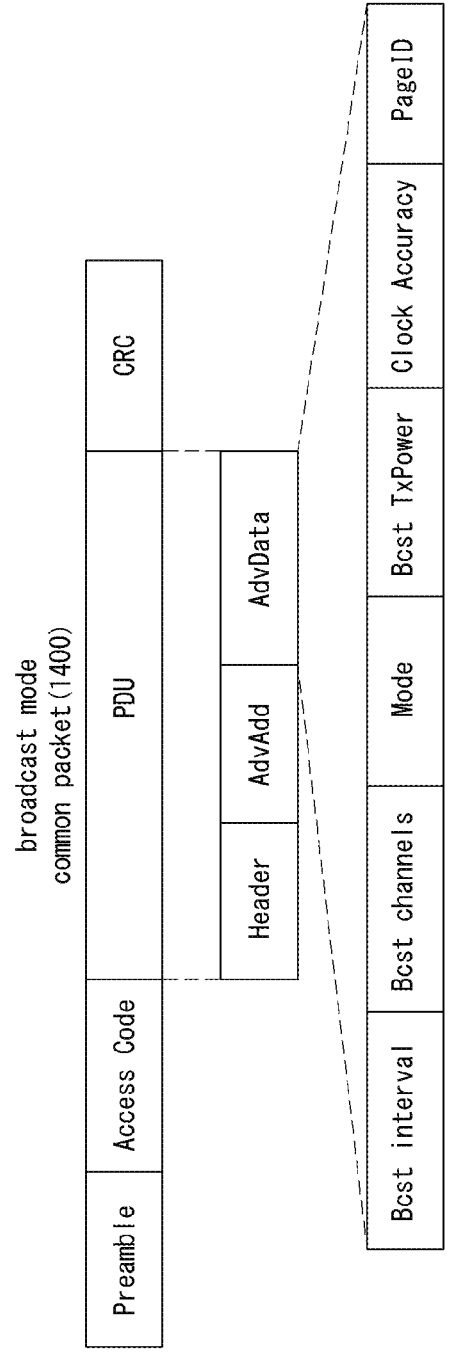
[Figure 14]

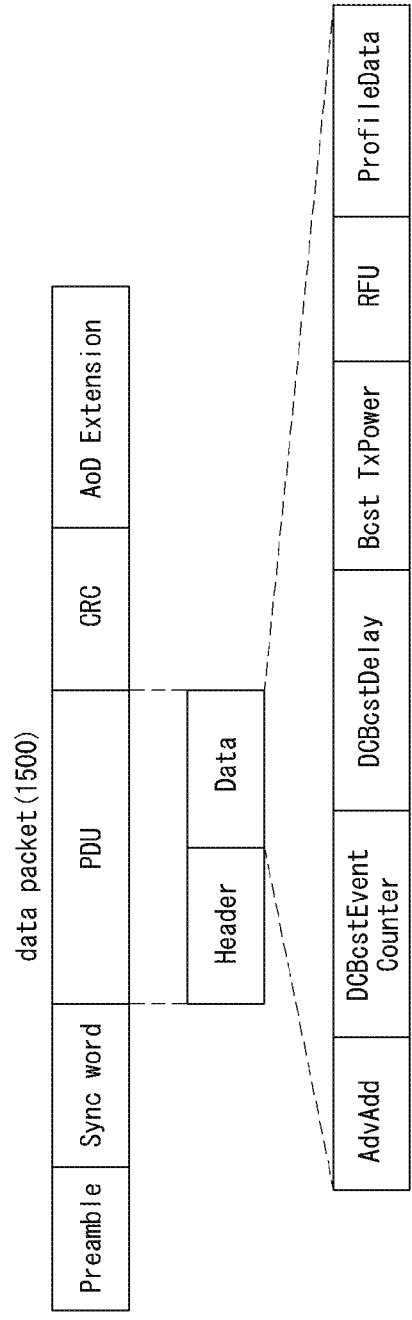
[Figure 15]

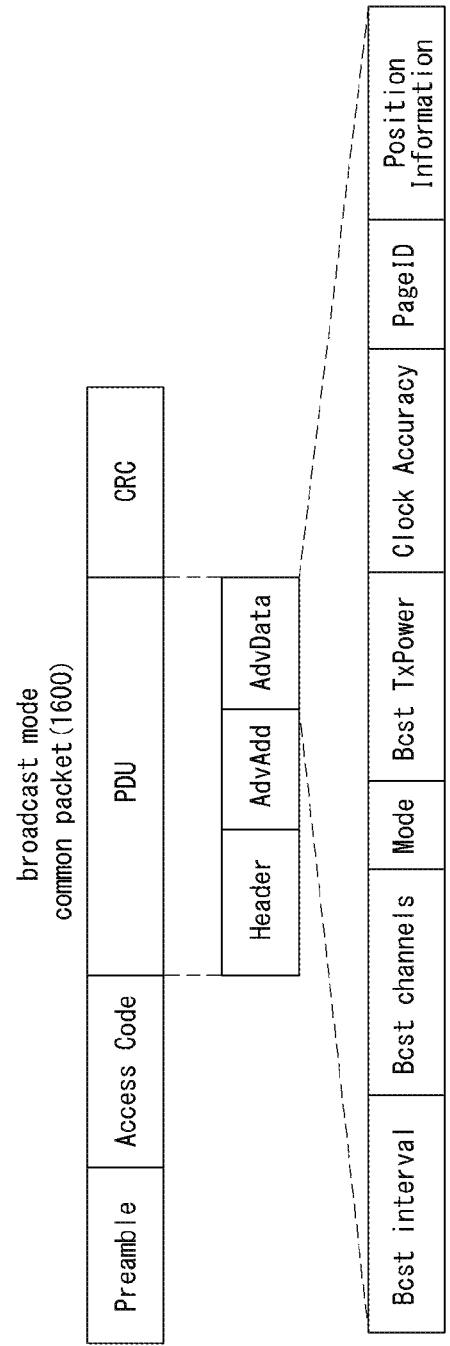
[Figure 16]

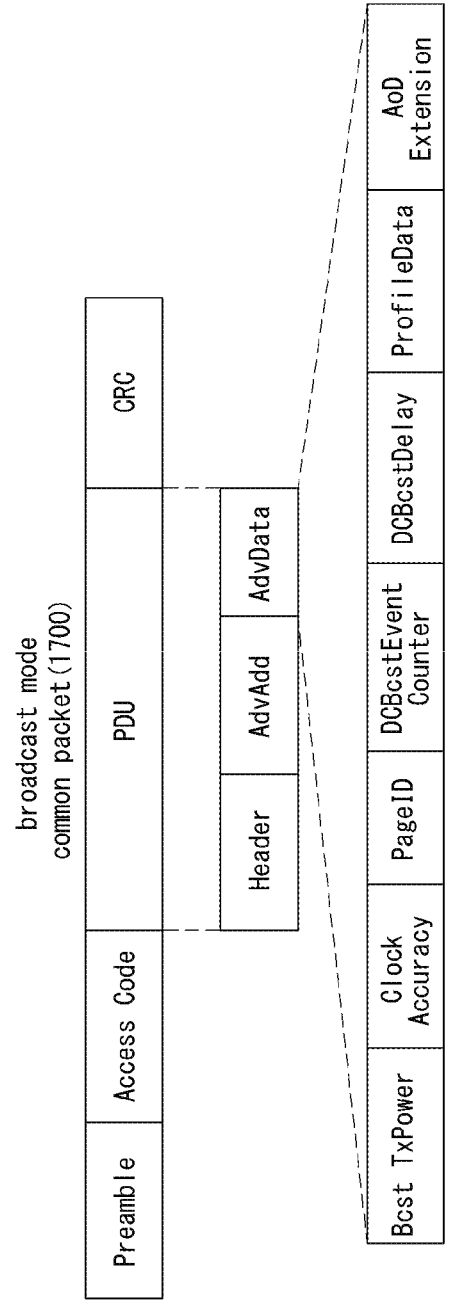

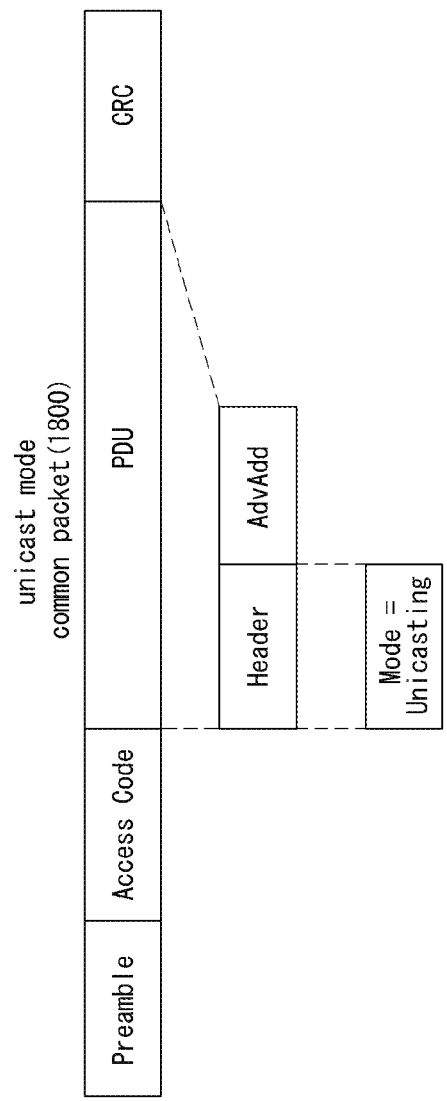
[Figure 18]

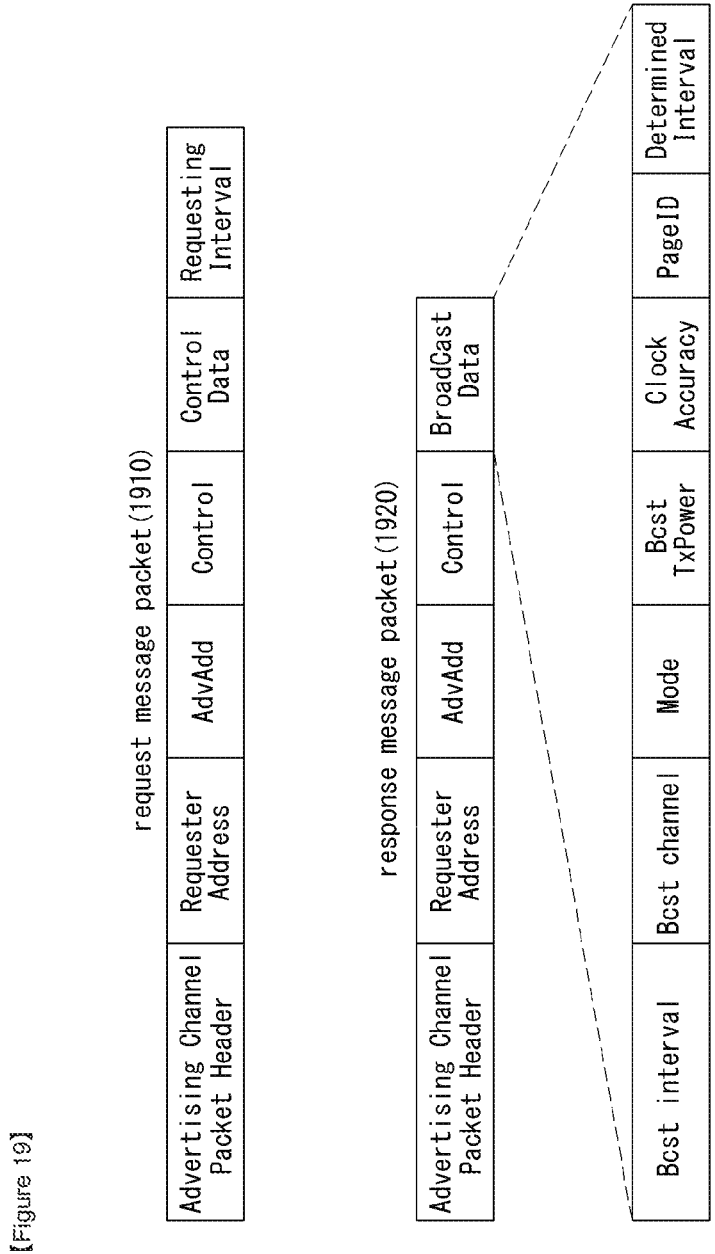

METHOD AND APPARATUS FOR CALCULATING LOCATION OF ELECTRONIC DEVICE

TECHNICAL FIELD

The present invention concerns a method for calculating a location of an electronic device, and particularly, to a method for calculating a location of an electronic device using Bluetooth communication under the circumstance with a short inter-device distance.

DISCUSSION OF RELATED ART

Bluetooth is a radio frequency standard proposed for short-range, point-to-multipoint transmission of voice and data.

Bluetooth may transmit radio signals through solid or non-metallic material. The Bluetooth transmission ranges from 10 cm to 10 m and may be expanded up to 100 m by increasing transmission power. This is based on a low-cost, short-range radio link and facilities ad-hoc access in a fixed or mobile communication environment.

Bluetooth utilizes a 2.4 Ghz band and makes use of frequency-hopping spread spectrum technology-based short-range communication. Bluetooth may benefit in light of relatively low power consumption, low costs, and relatively quick data speed, but due to its limited transmission distance that is a maximum of 100 m, is appropriate for use in a restricted space.

The present invention offers a method and apparatus of calculating a location of an electronic device using Bluetooth communication in a limited space by utilizing the above-described nature of Bluetooth.

SUMMARY

Objects

An object of the present invention is to provide a method and apparatus for calculating a location of an electronic device in a wireless communication system.

Another object of the present invention is to provide a method and apparatus for calculating a location of an electronic device using a signal transmitted from a host device in a wireless communication system.

Still another object of the present invention is to provide a method and apparatus for calculating a location of an electronic device using a signal transmitted using multiple antennas from a host device in a wireless communication system.

Yet still another object of the present invention is to provide a method and apparatus for calculating a location of an electronic device by calculating an inter-device angle using a signal transmitted using multiple antennas from a host device in a wireless communication system.

Solutions

To achieve the above objects, the present invention provides a method for calculating a location of an electronic device, the method comprising receiving a common packet from a host device, wherein the common packet includes at least one of a time information or frequency related information through which a data packet is transmitted; receiving the data packet based on information included in the common packet from the host device, wherein the data packet includes at least one of a location related information, or antenna related information of the host device; obtaining angle information indicating a location relation with the host device using at least one of the location related information or the antenna related information included in the received data packet; and calculating the location of the electronic device based on the angle information.

Further, according to the present invention, the data packet is transmitted using multiple antennas of the host device.

Further, according to the present invention, the location related information includes at least one of longitude, latitude or an altitude of the host device.

Further, according to the present invention, the common packet and the data packet are transmitted through different channels from each other.

Further, according to the present invention, the method further comprises measuring a strength of received signal of the data packet, wherein the received data packet includes a strength information of transmitted signal of the data packet, and wherein the location of the electronic device is calculated based on at least one of the angle information, the strength of received signal or the strength information of transmitted signal.

Further, the present invention provides an electronic device for calculating a location of the electronic device, the electronic device comprising: a communication unit configured to receive a common packet from a host device and receive a data packet based on information included in the common packet, wherein the common packet includes at least one of a time information or frequency related information through which a data packet is transmitted, and wherein the data packet includes at least one of location related information, or antenna related information of the host device; and a controller configured to obtain angle information indicating a location relation with the host device using at least one of the location related information or the antenna related information included in the received data packet, and calculate the location of the device based on the angle information.

Further, according to the present invention, the data packet is transmitted using multiple antennas of the host device.

Further, according to the present invention, the location related information includes at least one of longitude, latitude or an altitude of the host device.

Further, according to the present invention, the common packet and the data packet are transmitted through different channels from each other.

Further, according to the present invention, the electronic device further comprises a signal measurement configured to measure a strength of received signal of the received data packet, wherein the received data packet includes a strength information of transmitted signal of the data packet, and wherein the controller calculates the location of the electronic device based on at least one of the angle information, the strength of received signal or the strength information of transmitted signal.

Further, the present invention provides a method for calculating a location of an electronic device, the method comprising: receiving a common packet from a host device, wherein the common packet includes at least one of location related information or antenna related information of the host device; obtaining angle information indicating a location relation with the host device using at least one of the location related information or the antenna related information included in the received data packet; and calculating the location of the electronic device based on the obtained angle information.

Further, the present invention provides an electronic device for calculating a location of the electronic device, the electronic device comprising: a communication unit configured to receive a common packet from a host device, wherein the common packet includes at least one of location related information or antenna related information of the host device; and a controller configured to obtain angle information indicating a location relation with the host device using at least one of the location related information or antenna related information included in the received data packet, and calculate the location of the electronic device based on the obtained angle information.

Effects

According to the present invention, a method and apparatus for calculating a location of an electronic device provide the following effects.

According to the present invention, a location of an electronic device in a wireless communication system may be measured.

According to the present invention, a location of an electronic device in a limited space of a wireless communication system may be measured.

According to the present invention, a location of an electronic device may be calculated using a signal transmitted from a host device in a limited space of a wireless communication system.

According to the present invention, a location of an electronic device may be measured using a signal transmitted using multiple antennas from a host device in a limited space of a wireless communication system.

According to the present invention, a location of an electronic device may be measured by calculating an inter-device angle using a signal transmitted using multiple antennas from a host device in a limited space of a wireless communication system.

According to the present invention, a data packet for calculating location is received only when accuracy of calculating a location of an electronic device may be enhanced, so that time and power consumption for location calculation may be reduced.

According to the present invention, information contained in a common packet and a data packet is simultaneously received, thus reducing time and power consumption for location calculation.

According to the present invention, a data packet for location calculation is transmitted only at the request of an electronic device, thus saving power of the electronic device and network traffic.

According to the present invention, when an electronic device requests a data packet for location calculation, other electronic devices that do not request a data packet for location calculation may receive the data packet, thus enabling a location calculation service to be supported for more electronic devices.

According to the present invention, a data packet may be requested for transmission and received prior to the time of transmission of a data packet transmitted from a host device. Accordingly, UX (User eXperience) may be enhanced.

BRIEF DESCRIPTION OF DRAWINGS

FIG. 1 illustrates an example of using Bluetooth communication according to the present invention;

FIG. 2 illustrates an overall internal structure of an electronic device according to the present invention;

FIG. 3 illustrates schematically a method of calculating a location of a electronic device using Bluetooth communication according to the present invention;

FIGS. 4 and 5 illustrate a first embodiment of the present invention, wherein

FIG. 4 is a flowchart illustrating a process of calculating location by obtaining angle information with respect to a host device, and FIG. 5 is a block diagram illustrating the process of the first embodiment in view of a PCD;

FIGS. 6 to 8 illustrate a second embodiment of the present invention, wherein

FIG. 6 illustrates an example of receiving signals for location calculation from multiple PHDs, and FIG. 7 illustrates an example in which location calculation accuracy of a PCD varies depending on the location of a PHD;

FIG. 8 is a flowchart illustrating a method of receiving only data packets of a host device that may enhance location calculation accuracy;

FIG. 9 is a flowchart illustrating a method of transmitting a common packet with data for location calculation contained in the common packet, according to a third embodiment of the present invention;

FIG. 10 is a flowchart illustrating a method of calculating a location of a PCD by the PCD sending a request for data packet to a PHD, according to a fourth embodiment of the present invention;

FIG. 11 is a flowchart illustrating a method of transmitting data packets to other electronic devices when a PCD sends a request for data packet to a PHD, according to a fifth embodiment of the present invention;

FIG. 12 is a flowchart illustrating a method of a PCD sending a request for data packet for location calculation when a PHD is in broadcast mode, according to a sixth embodiment of the present invention;

FIG. 13 is a flowchart illustrating an example where a PCD sends a request for data packet to a PHD that is in broadcast mode, according to a seventh embodiment of the present invention;

FIGS. 14 and 19 illustrate packet structures according to the present invention, wherein FIG. 14 illustrates a structure of a common packet when a PHD is in broadcast mode, and FIG. 15 illustrates a structure of a data packet;

FIG. 16 illustrates a structure of a common packet used in the second embodiment of the present invention;

FIG. 17 illustrates a structure of a common packet used in the third embodiment of the present invention;

FIG. 18 illustrates a unicast mode common packet; and

FIG. 19 illustrates a packet structure of a response message from a PHD and a packet structure of a request message for a PCD to send for data packet.

DETAILED DESCRIPTION OF EMBODIMENTS

The foregoing objects, features, and advantages of the present invention will be more apparent from the detailed description taken in conjunction with the drawings. However, various modifications and embodiments are possible, and the specific embodiments that follow are shown in the drawings and are provided for the purpose of description. Throughout the specification, the same reference numerals are used to denote the same elements. When determined to make the subject matter of the present invention unnecessarily unclear, detailed description of known functions and configurations is skipped.

Hereinafter, methods and apparatuses according to the present invention are described in greater detail with reference to the drawings. As used herein, the term "module" and "unit" are assigned for ease of description and may be interchangeably used.

As used herein, "electronic device" may include a portable phone, a smartphone, a laptop computer, a digital broadcast terminal, a PDA (Personal Digital Assistant), a PMP (Portable Multimedia Player), and a navigation system. However, it is apparent to those of ordinary skill in the art that configurations according to embodiments of this disclosure may also be applicable to stationary terminals such as digital TVs or desktop computers, except when applied only to mobile terminals.

FIG. 1 illustrates an example of using Bluetooth communication according to the present invention.

Referring to FIG. 1, electronic devices conduct radio communication to transmit and receive data using Bluetooth.

Specifically, an electronic device 100 equipped with a Bluetooth module performs data communication with a host device 110 equipped with a Bluetooth module, as shown in FIG. 1.

Bluetooth utilizes frequency hopping and a 2.4 GHz ISM (Industrial Scientific Medical) high-frequency band and thus offers more robustness against external interference and communication security as compared with radio communication adopting a fixed channel of a low-frequency band.

Further, even when the electronic device 100 is not paired with the host device 110, data can be exchanged through an advertising channel among physical channels of Bluetooth. That is, the host device 110 may transmit common packets to the electronic device 100 even not pairing up with the electronic device 100.

Bluetooth 4.0 adopts low energy technology enabling power consumption to be dramatically reduced.

The Bluetooth communication was conventionally used in such a manner that the host device 110 sends a packet containing strength information of transmitted signal to the electronic device 100, and upon reception of the packet, the electronic device 100 measures strength of received signal to measure the location of the electronic device using the measured strength of received signal and the strength information of transmitted signal included in the packet.

However, such method suffered from low accuracy. Since the received signal might have been reflected by a plenty of obstacles before received, even when the strength of the received signal is measured precisely, the distance obtained through the signal strength may be very low in its accuracy.

According to the present invention, the host device 110 may send signals through multiple antennas. When receiving the signals, the electronic device 100 may measure the location of the electronic device 100 by calculating an angle between itself and the host device 110 using, e.g., array information of the multiple antennas. Accordingly, the location calculation may have increased accuracy.

FIG. 2 illustrates an overall internal structure of an electronic device according to the present invention.

Referring to FIG. 2, the electronic device 200 according to the present invention includes a user interface unit 210, a display unit 220, a memory 230, a multimedia unit 240, a wireless network unit 250, a power supply unit 260, a controller 270, and a transmission/reception antenna 280.

The components shown in FIG. 2 are not inevitable, and more or less components may be implemented in the electronic device 200.

The transmission/reception antenna 280 is shown as a single antenna in FIG. 2. However, a plurality of antennas may be provided. Accordingly, the electronic device 200 according to the present invention may transmit and receive data to/from a host device using multiple antennas. The transmission/reception antenna 280 may receive a signal transmitted from the host device through the wireless network unit 250.

The wireless network unit 250 is a single-chip radio technology processor having an integrated RF (Radio Frequency) transceiver.

The wireless network unit 250 may include an RF transmitter or may be configured to implement a Bluetooth v4.0 protocol stack containing Bluetooth low energy.

The wireless network unit 250 may receive a signal transmitted from the host device using the transmission/reception antenna 280. The host device may transmit a signal to the electronic device 200 through an advertising channel or a data channel.

The multimedia unit 240 is a device for replaying various types of multimedia. The multimedia unit 240 may be implemented in the controller 270. The multimedia unit 240 may be implemented separately from the controller 270.

The controller 270 may instruct and manage all operations of the electronic device 200 and may interwork with each device. For example, the controller 270 may obtain angle information indicating a location of the host device using information contained in a signal received through the wireless network unit 250 from the host device.

Further, the controller 270 may instruct the display unit 220 to output a location of the electronic device 200.

The controller 270 may be configured to process a received signal and may store information contained in the received signal to the memory 230.

The controller 270 may also be denoted a controller, a microcontroller, or a microprocessor, and the controller 270 may be implemented in hardware, firmware, software, or a combination thereof.

The memory 230 is a medium for storing various pieces of information from a terminal and is connected with the controller 270 to temporarily store a program, application, general file and data contained in input/output signals for operation of the controller 270.

The memory 230 may include at least one-type storage medium among a flash memory type, a hard disk type, a multimedia card micro type, a card-type memory (e.g., SD or XD memory), a RAM (Random Access Memory), an EEPROM (Electrically Erasable Programmable ReadOnly Memory), a PROM (Programmable ReadOnly Memory) magnetic memory, a magnetic disc, and an optical disc. The electronic device 200 may operate in association with a web storage performing storage function of the memory 230 over the Internet.

The user interface unit 210 may receive a signal for operation of the electronic device 200 from a user. When receiving a command for calculating a location of the electronic device 200 through the user interface unit 210, the electronic device 200 may calculate the location of the electronic device 200 using the information received from the host device and output through the display unit 220.

The power supply unit 260 is connected with the controller 270 and power on/off the electronic device 200.

FIG. 3 illustrates schematically a method of calculating a location of an electronic device using Bluetooth communication according to the present invention.

Referring to FIG. 3, the electronic device 300 equipped with a Bluetooth module may communicate with other devices equipped with a Bluetooth module. At this time, the electronic device 300 need in some cases calculate its location in a building or a space where Bluetooth communication is possible. For example, in order to discover a specific location in a huge shopping mall or building, its location should be calculated so that the user may precisely arrive at the destination.

Further, sometimes, a location between a specific device and the electronic device 300 needs to be calculated.

Accordingly, the electronic device 300 may use other neighboring Bluetooth communication-available devices in order to calculate its location. According to a method of calculating a location between the electronic device 300 and a host device equipped with a Bluetooth module, the electronic device 300 conventionally measured the strength of received signal from a host device 310 and measured its location using the strength of received signal and the strength information of transmitted signal contained in the received signal.

However, such method suffers from a lowering in accuracy due to obstacles. Accordingly, the electronic device 300 may calculate angle information that may indicate a location of the host device 310 using the signal transmitted from the host device 310, and may precisely calculate the location of the electronic device 300 and the host device 310.

In such case, the host device 310 may transmit a signal using a multiple antennas to the electronic device 300 so that the electronic device 300 may calculate the angle information. The electronic device 300 may include a single antenna or the multiple antennas in order to receive a signal transmitted from the host device 310. Hereinafter, a method of calculating a location through a signal received by the electronic device 300 from the host device is described in further detail.

Hereinafter, an electronic device whose location is to be measured is assumed as a PCD (Positioning Client Device), and a host device transmitting a signal for location calculation is assumed as a PHD (Positioning Host Device). The terms are provided for ease of description, and the present invention is not limited thereto.

FIG. 4 is a flowchart illustrating a process of calculating angle information with a host device and calculating a location according to a first embodiment of the present invention.

Referring to FIG. 4, the PCD 410 may receive a data packet from the PHD to calculate its location. The PCD 410 may receive a data packet from one PHD or data packets from multiple PHDs in order for location calculation.

Specifically, the PCD 410 may turn to scanning mode for searching a common packet transmitted through an advertising channel in order to receive a common packet transmitted from the PHD1 420.

As physical channels for transmitting information on Bluetooth, there are an advertising channel and a data channel. There may be three advertising channels and 37 data channels.

The common packet transmitted through the advertising channel may mean a packet that may be received by any devices.

In order for Bluetooth-supportive electronic devices to conduct pairing, if, while common packets are being received through the advertising channel, a received common packet is a common packet transmitted from an electronic device attempting to pair, it may shift to the data channel based on information contained in the common packet and does pairing, thus enabling data exchange.

Since Bluetooth allows for data transmission while quickly shifting to the data channel (frequency hopping), hopping sequence and time information need to be exactly shared for data transfer.

Accordingly, the hopping frequency and time information may be contained in the common packet and may be transmitted to the electronic device through the advertising channel.

The PHD1 420 may shift to a broadcast state, and the PHD1 420 when shifted to the broadcast state may transmit the common packet through the advertising channel.

The common packet transmitted thus may be received by the PCD 410 searching the advertising channel. In other words, the PCD 410 may receive its desired common packet, i.e., the common packet of the PHD1 420 while on search for common packets transmitted through the advertising channel (S410).

The common packet may contain at least one of the transmission time or transmission frequency information of a data packet that the PCD 410 is to transmit through the data channel.

When receiving the common packet from the PHD1 420, the PCD 410 may shift to the data channel based on the information contained in the common packet and wait to receive data packets transmitted from the PHD1 420 (S420).

The PCD 410 may receive a data packet transmitted from the PHD1 420 at the time contained in the common packet received from the PHD1 420 (S430). The data packet received by the PCD 410 may contain at least one of antenna array information of the PHD1 420 and location information of the PHD1 420.

The location information of the PHD1 420 may contain at least one of the latitude, longitude, altitude, azimuth, or building floor count of where the PHD1 420 is located, and such information may be represented in bits, index values contained in a preset table, a bitmap form, or in other ways.

The PCD 410 may obtain angle information that may indicate the location of the PHD1 420 based on the information contained in the data packet received from the PHD1 420.

The angle information may be calculated based on the antenna array of the PHD1 420. For example, assume that the PHD1 420 includes two antennas. In such case, if the two antennas are spaced apart from each other by half a wavelength of a signal transmitted, the PCD 410 may be aware that the PCD 410 is located at 90 degrees in the antenna array direction of the PHD1 420 when the strength of a signal transmitted from the PHD1 420 is highest and is located at 0 degrees in the antenna array direction of the PHD1 420 when the strength of the signal transmitted from the PHD1 420 is lowest.

The PCD 410 may obtain angle information of the PHD1 420 by the above-described method and may measure a location of the PCD 410 using the obtained angle information (S440).

However, the measured location may have an error, and in order to reduce such error, the PCD 410 may repeat the above process with other PHD, i.e., the PHD 2 430. In other words, the PCD 410 may be in a search state for receiving a common packet (S450).

When receiving the common packet of the PHD2 430 (S460), the PCD 410 may wait to receive a data packet based on the information contained in the PHD2 430 (S470).

When the PHD2 430 transmits a data packet through a data channel, the PCD 410 receives the transmitted data packet (S480) and may obtain angle information of the PHD2 430 using the received data packet.

The PCD 410 may do location calculation with the obtained angle information (S40) and may conduct more precise location calculation also using the result of location calculation by the PHD1 420.

FIG. 5 is a block diagram illustrating a process in view of a PCD, according to a first embodiment of the present invention.

Referring to FIG. 5, the PCD may calculate an angle between the PCD and the PHD based on information contained in a packet received from the PHD and may measure a location of the PCD therethrough.

Specifically, the PCD may be left in standby state. In the standby state, the PCD may wait without transmitting or receiving any data.

The PCD may shift from the standby state to scanning state for receiving common packets transmitted from the PHD in broadcast state. The PCD may receive a common packet transmitted from the PHD among the common packets transmitted through an advertising channel in the scanning state (S510).

The common packet may contain at least one of transmission time or transmission frequency information of a data packet transmitted from the PHD.

The PCD may receive through the data channel a data packet transmitted from the PHD based on the information contained in the common packet (S520).

The data packet may contain information necessary for the PCD to calculate location information. That is, the data packet may contain at least one of antenna array information of the PHD or location information of the PHD.

The PCD may obtain angle information representing the location of the PHD based on the information on the data packet transmitted (S530) and may calculate the location of the PCD based on the angle information (S540).

FIG. 6 illustrates an example in which a PCD 650 receives signals for location calculation from multiple PHDs according to a second embodiment of the present invention.

Referring to FIG. 6, the PCD 650 may receive signals for location calculation from multiple PHDs to calculate its location based on the received signals in order for accurate location calculation.

Specifically, the PCD 650 may receive signals from multiple neighboring Bluetooth devices, i.e., PHDs, in order to measure whether it is located. In this case, a method of calculating a location by receiving a signal from one PCD offers low accuracy, and receiving signals from multiple PCDs may provide higher accuracy.

The PCD 650 may receive signals from a PHD1 610, a PHD2 620, a PHD3 630, and a PHD4 640 for location calculation. However, signal reception from too many PHDs may cause time and power consumption. Further, in case signals unnecessary to raise accuracy of location calculation are received, time and power consumption may be increased.

In the case as shown in FIG. 6, the PCD 650 might not need signals that are transmitted from the PHD2 620 and the PHD4 640. Hereinafter, such problems are described in further detail.

FIG. 7 illustrates an example where accuracy of location calculation of a PCD varies depending on the location of a PHD according to a second embodiment of the present invention.

Referring to FIG. 7, it can be seen that the accuracy range for location calculation of the PCD 700 varies depending on the location of the PHD.

Specifically, (a) in case the PCD 700 receives signals for location calculation from a PHD1 710 and a PHD3 730, the PCD 700 may calculate its location within a location calculation region 740 where the error ranges 750 of their respective PHDs overlap each other.

The location calculation region 740 measured from the PHD1 710 and PHD3 730 can be seen not to significantly depart from the PCD 700.

(b) In contrast, when the PCD 700 receives signals for location calculation from the PHD1 710 and the PHD2 720 to measure its location, the location calculation region 740 where the error ranges 750 of the PHDs overlap each other may be seen significantly departing from the PCD 700.

Further, when receiving signals for location calculation from the PHD1 710 and the PHD3 730, the PCD 700 receiving signals for location calculation from the PHD2 720 may not contribute to enhancement in accuracy and may rather incur power and time consumption.

Thus, when receiving signals for location calculation from the PHD1 710, the PCD 700 may exhibit higher accuracy and reduce power and time consumption when receiving signals for location calculation from the PHD3 730 rather than from the PHD2 720.

FIG. 8 is a flowchart illustrating a method of receiving a data packet from only host device that may enhance accuracy of location calculation according to a second embodiment of the present invention.

Referring to FIG. 8, when receiving signals for location calculation from multiple PHDs around the PCD 410, the PCD 410 might not receive a data packet from a specific PHD for higher accuracy.

Specifically, as described above, the PCD 410 may search common packets received through an advertising channel from a PHD in order to receive signals for calculating its location (S810).

While searching common packets, the PCD 410 may receive common packets transmitted from the PHD1 420 (S812). The received common packet may contain at least one of time or frequency of a data packet for location calculation from the PHD1 420 or information from which the location of the PHD1 may be determined.

The location information of the PHD1 420 may contain at least one of latitude, longitude, altitude, azimuth or building flow number of where the PHD1 420 is located, and such information may be represented in bits, index values of a predetermined table, bitmap form, or in other manners.

The PCD 410 may receive the data packet for location calculation transmitted from the PHD1 420 based on the information contained in the received common packet (S816) and may calculate the location of the PCD 410 therethrough.

The PCD 410 may search common packets again for higher location calculation accuracy (S820) and may receive common packets from the PHD2 430 (S822).

The common packet received from the PHD2 430 may contain the same type of information as the common packet received from the PHD1 410 and through this, the PCD 700 may measure the location of the PHD2 430.

In case the PHD2 430 is located where accuracy of location calculation might not be expected to be enhanced as described above in connection with FIG. 7, the PCD 700 might not receive data packets from the PHD2 (S82).

By doing so, the PCD 700 may reduce time and power consumption.

The PCD 700 may search common packets received from neighboring PHDs again (S826) and receive common packets received from the PHD3 440 (S826).

The common packet received from the PHD3 440 may contain the same type of information as the common packet received from the PHD1 440.

When receiving common packets from the PHD3 440, the PCD 700 may shift to a data channel based on the information contained in the common packet received from the PHD3 in case the PHD3 440 is located where accuracy of location calculation of the PCD 700 may be enhanced, thereby waiting to receive data packets (S830).

In case a data packet is transmitted from the PHD3 440 within a time contained in the common packet received from the PHD3 440, the PCD 700 may enhance accuracy of location calculation by calculating its location based on the information contained in the data packet.

FIG. 9 is a flowchart illustrating a method of transmitting a common packet with data for location calculation contained in the common packet, according to a third embodiment of the present invention.

Referring to FIG. 9, the PCD 410 may receive a common packet from the PHD and may measure the location of the PCD 410 based on the information contained in the common packet.

Specifically, the PCD 410 that has been in standby state may shift to scanning state in order to receive the common packet (S910).

The PHD1 420 may transmit a common packet through an advertising channel (S920), and the PCD 410 may receive the common packet transmitted from the PHD1 420 while searching common packets received through the advertising channel.

The PHD1 420 may include at least one of antenna array information of the PHD1 or location information of the PHD1 420 in the common packet transmitted from the PHD1 420 and transmit it.

The location information of the PHD1 420 may contain at least one of latitude, longitude, altitude, azimuth, or building floor number of where the PHD1 420 is located, and such information may be represented in bits, index values of a predetermined table, bitmap form, or in other manners.

When receiving the common packet from the PHD1 420, the PCD 410 may obtain angle information indicating a location relation with the PHD1 420 using at least one of the antenna array information or location information of the PHD1 420 contained in the common packet.

The angle information may indicate the location of the PCD with respect to an antenna array state of the PHD1 420.

Based on the angle information, the PCD 410 may calculate its location information. When calculating its location through the PHD1 420, the PCD 410 may go back to the common packet searching step (S940) to raise accuracy of the measured location and receive common packets from the PHD2 430 (S950).

Further, in order to increase accuracy of location calculation, the PHD1 420 may include a strength information of transmitted signal in the common packet, in additional to the angle information, and send it.

The PCD 410 may measure strength of received signal of the received common packet and may use it together with the strength information of transmitted signal and the angle information in order for location calculation.

FIG. 10 is a flowchart illustrating a method in which a PCD 1010 sends a request for data packet to a PHD 1020 to calculate its location according to a fourth embodiment of the present invention. The same steps as those described in the above drawings are excluded from detailed description thereof.

Referring to FIG. 10, the PCD sends a request for a time when transmission of a data packet is desired for location calculation so that the PCD may receive a data packet within the requested time from the PHD to calculate a location.

Specifically, the PHD 1020 may transmit a common packet to the PCD 1010 in unicast mode (S1010). The unicast mode refers to a state where data is transmitted to a specific device only.

The transmitted common packet may contain only information indicating that the PHD 1020 is the device that has sent the common packet.

When receiving the common packet, the PCD 1010 transmits a request message for transmission of a data packet for location calculation to the PHD 1020 (S1020).

The request message may contain information relating to a time when the PCD 1010 is to receive a data packet for location calculation.

When receiving the request message, the PHD may determine a time for transmitting a data packet based on the time-related information contained in the request message and may send a response message containing information on the determined time and frequency information to the PCD 1010 (S1030).

At this time, the determined time for transmitting a data packet is the same as the time requested by the PCD 1010 or a time that is not past the requested time.

Thereafter, the PHD 1020 may send through multiple antennas to the PCD 1010 a data packet for location calculation at the frequency and determined time for transmitting a data packet (S1040).

When receiving the data packet, the PCD 1010 may calculate an angle with respect to the PHD 1020 based on the information contained in the data packet and through this may calculate a location of the PCD 1010.

At this time, it, together with a method of calculating distance by calculating a reception signal of the data packet and transmission power of the transmission end contained in the data packet, would further enhance accuracy of location calculation.

FIG. 11 is a flowchart illustrating a method of transmitting a data packet to other electronic device when a PCD sends a request for data packet to a PHD according to a fifth embodiment of the present invention.

Referring to FIG. 11, when receiving a request for data packet from the PCD1 1110, the PHD may send data packets to other neighboring PCDs as well as the PCD1 1110.

Steps S1100 through S1130 shown in FIG. 11 are the same as steps S1000 through S1030 described above in connection with FIG. 10 and thus detailed description thereof is skipped.

Hereinafter, the process shown in FIG. 11 is described in greater detail. The PHD 1100 may send common packets to other ambient PCDs, PCD2 1120 and PCD3 1130, in broadcast mode (S1140). At this time, the PCD1 1110 is already aware of time information and/or frequency information regarding transmission of a data packet from the PHD 1100 and thus might not do any common packet search.

The time information and/or the frequency information are included in a response message.

The response message is transmitted in response to a request message from the PHD 1020.

Further, the information contained in the response message is the same in type as the information contained in the common packet, and thus, step S1130 may be omitted. That is, without sending a response message to the PCD1 1110, a common packet may be immediately sent to the PCD1 1110 in broadcast mode.

The PCD1 1110 receiving the response message and/or the common packet and the PCD2 1120 and the PCD3 1130 receiving the common packet may be given transmission of data packets from the PHD 1100 through the information contained in the response message or the common packet (S1150).

When receiving data packets, the PCD1 1110, the PCD2 1120 and the PCD3 1130 each may calculate an angle with respect to the PHD based on the information contained in the data packets.

The measured angles may differ from each other for each PCD, and through this, each PCD may calculate its own location (S1160). At this time, by calculating reception power of data packet and transmission power of a transmitter contained in the data packet, a distance from the PHD may be computed, and when such method is fulfilled together, accuracy of location calculation may be enhanced.

FIG. 12 is a flowchart illustrating a method of requesting a data packet for location calculation by a PCD 1210 in case a PHD 1220 is in broadcast mode according to a sixth embodiment of the present invention.

Referring to FIG. 12, the PCD 1210, in case the PCD 1210 desires to receive a data packet at a time other than time information contained in a common packet received from the PHD 1220, sends such request to the PHD, so that the PCD 1210 may receive a data packet for location calculation within a time shorter than the time contained in the common packet or at a desired time.

Specifically, the PCD 1210 may search common packets received through an advertising channel (S1200). While in search of the common packets, the PCD 1210 may receive a common packet from the PHD 1220 that is left in broadcast mode (S1210).

When receiving the common packet, the PCD 1210 may send a request message to the PHD 1220 when the PCD 1210 desires to receive a data packet earlier than the time contained in the common packet.

The request message may be the same as the request message described above in connection with FIG. 10.

Steps S1230 to S1250 are the same as steps S1030 to S1050, respectively, of FIG. 10 and description thereof is skipped.

FIG. 13 is a flowchart illustrating an example where a PCD1 1310 sends a request for data packet to a PHD 1300 that remains in broadcast mode according to a seventh embodiment of the present invention.

Referring to FIG. 13, the PCD1 1310, upon desiring to receive a data packet at a time other than time information contained in a common packet received from the PHD 1300, sends such request to the PHD 1300 so that the PCD1 1310 may receive data packets for location calculation together with other neighboring PCDs within a shorter time than the time contained in the common packet or at a desired time. Accordingly, not only the PCD1 but also other ambient PCDs may measure their own locations.

Specifically, the PCD1 1310 may search common packets received through an advertising channel (S1300). While in search of common packets, the PCD1 1310 may receive a common packet from the PHD 1300 that is in broadcast mode (S1310).

When receiving the common packet, the PCD1 1310, if it desires to receive the data packet earlier than the time contained in the common packet, may send a request message to the PHD 1300.

The request message may be identical to the request message described above in connection with FIG. 10.

Hereinafter, steps S1330 to S1350 are the same as steps S1130 to S1150, respectively, of FIG. 11 and detailed description thereof is skipped.

FIG. 14 illustrates a structure of a common packet in case a PHD is in broadcast mode. FIG. 14 shows a general structure of a common packet 1400 that is transmitted through an advertising channel from a PHD in broadcast mode.

The common packet 1400 may contain at least one of time information or frequency information for transmission of a data packet.

Specifically, the common packet may include a preamble field, an access code field, a PDU field, and a CRC field. The preamble field may include one octet, the access code field may include four octets, the PDU field may include at least two octets up to 39 octets, and the CRC field may include three octets.

Such octet architecture is merely an example, and the present invention is not limited thereto.

The preamble field may be used for synchronization between two systems in data communication. According to the present invention, the preamble field may be used for synchronization the PHD with the PCD.

The common packets 1400 transmitted through the advertising channel may have an 8-bit value, "10101010b" in the preamble field.

The access code field is a code indicating an access address, and the common packet 1400 that is transmitted through the advertising channel may have a value of "10001110100010011011111011010110b(0x8E89BED6)".

The PDU (Packet Data Unit) field refers to a portion containing data. The PDU field is split into a header and a payload. Table 1 illustrates an example of a data format of the header.

TABLE 1

| PDU Type | RFU | TxAdd | RxAdd | Length | RFU |
| --- | --- | --- | --- | --- | --- |

In table 1, The PDU Type field includes a type of the PDU, and the RFU field is empty field.

The TxAdd field and the RxAdd field include information related to the PDU Type, and the Length field includes the length of the Payload field that may be represented in octets.

In case the TxAdd field or the RxAdd field is not defined, it may be used as the RFU field.

Table 2 illustrates an example of data format of a payload.

The Payload may include an AdvA field indicating the address of the PHD and an AdvData field indicating transmission data as shown in Table 2 below.

TABLE 2

| Payload | |
| --- | --- |
| AdvAdd (6 octets) | AdvData (0-31 octets) |

The transmission data, AdvData field, may consist of a Bcst interval field, a Bcst channel field, a Mode field, a Bcst TxPower field, a Clock Accuracy field, and a PageID field. The Bcst interval field may include information on what time after transmission of the common packet a data packet is to be sent, and the Bcst channel field may include frequency hopping pattern information in which the data packet is to be delivered.

The Mode field may indicate whether, after transmission of the common packet, the data packet is to be transmitted in broadcast mode or unicast mode.

The Bcst TxPower field includes strength information of transmitted signal of the transmitter, and the Clock Accuracy field includes Clock information of a transmission signal, and the PageID field includes the ID of the transmitter.

The CRC field is a field for error detection when the data packet is transmitted.

FIG. 15 illustrates a structure of a data packet 1500. The data packet 1500 may mean a packet that is transmitted from a PHD to a PCD in order for location calculation and may be transmitted through a data channel.

Hereinafter, the structure of the data packet 1500 is described in detail. The data packet 1500 may include a preamble field, a Sync word filed, a PDU field, a CRC field, and an AoD Extension field.

The Sync word field is a field that carries frequency hopping pattern information and timing information to enable communication between transmitter and receiver.

The AoD Extension field is a field that enables location calculation and an angle of departure and may carry a preset long bit sequence. By receiving the AoD Extension field at the receiver, the antenna array and angle of the transmitter may be computed.

The PDU may include a header and a data field. The data field may include an Advadd field, a DCBcstEventCounter field, a DCBcstDealy field, an RFU field, or a ProfileData field.

Table 3 illustrates an example of a data format of the header of the PDU and each field has been already described above in connection with FIG. 14, and thus its description is skipped.

TABLE 3

| PDU Type | RFU | TxAdd | RFU | Length | RFU |
| --- | --- | --- | --- | --- | --- |

The DCBcstEventCounter field is a field that indicates what number of turn the data packet 1500 is transmitted, and the DCBcstDealy field is a field includes interval information between the data packet 1500 and a next data packet.

The data packet (1500) may be transmitted repeatedly several times in order for exact location calculation at the receiver, and thus may require the DCBcstEventCounter field and the DCBcstDealy field.

The ProfileData field may include information necessary for location calculation of the PCD. Accordingly, it may include the antenna array information of the PHD or the location information of the PHD.

The antenna array information of the PHD may include at least one of the number of antennas, height of antenna, or 3D coordinate of antenna. The location information of the PHD may include at least any one of information on latitude, longitude, altitude, and building floor number of the PHD in order to exactly indicate where the PHD is specifically located.

Such latitude, longitude, or altitude information may be expressed in bits, indexes, or bitmap.

FIG. 16 illustrates a structure of a common packet used according to a second embodiment of the present invention.

Referring to FIG. 16, the common packet 1600 is a common packet used in the second embodiment described above in connection with FIGS. 6 to 8 and may be transmitted containing location information that allows a PCD to grasp of several neighboring PHDs in order to enhance accuracy of location calculation. Specifically, in the common packet 1600, a Position information field that allows the location of the PHD that has sent the common packet 1600 to be known is added to the AdvData of the common packet described above in connection with FIG. 15.

The Position information field may include at least any one of altitude information, latitude information, longitude information, or building floor number information of the PHD so that the location of the PHD that has sent the common packet 1600 may be grasped.

The longitude information and the latitude information may be obtained through computation. For example, the longitude information may be calculated by the following equation 1:

$$N = \text{floor}\frac{X}{180}2^{31} \quad \text{[Equation 1]}$$

The latitude information may also be calculated by the following equation 2:

$$N = \text{floor}\frac{X}{90}2^{31} \quad \text{[Equation 2]}$$

The information on the PHD's altitude, latitude, longitude, and building floor number may be represented in bits, indexes, or bitmap.

FIG. 17 illustrates a structure of a common packet used according to a third embodiment of the present invention.

The common packet 1700 shown in FIG. 17 is the common packet used in the third embodiment described above in connection with FIG. 9 and may be used for reducing time and power for a PCD to perform location calculation.

The common packet 1700 may further include information for location calculation in addition to the common packet transmitted through an advertising channel.

Specifically, the common packet 1700 may include the common packet described above in connection with FIG. 14 and only information for receiving the common packet 1700 and location calculation among the information contained in the data packet described above in connection with FIG. 15.

The information for receiving the common packet 1700 and location calculation may include the Bcst TxPower field, Clock Accuracy field, PageID field, DCBcstEventCounter field, DCBcstDelay field, ProfileData field, and AoD Extension field.

The fields are the same as the fields described above in connection with FIGS. 14 to 16 and thus detailed description thereof is skipped.

FIG. 18 illustrates a common packet in unicast mode.

Referring to FIG. 18, a common packet 1800 transmitted when the PHD is in unicast mode. Only the information that the device that has transmitted the common packet 1800 is the PHD may be known through the common packet 1800.

The common packet 1800 in unicast mode illustrates that the only difference from the broadcast mode common packet described above in connection with FIG. 14 is the PDU field.

The PDU field of the common packet 1800 may include a header and an AdvAdd field, and the header may inform that the PHD is in unicast mode.

The AdvAdd field is a field indicating the address of the PHD.

FIG. 19 illustrates a packet 1910 structure of a request message for requesting a data packet and a packet 1920 structure of a response message from a PHD.

Referring to FIG. 19, the PCD may transmit a request message for transmission of a data packet, and the PHD may transmit to the PCD a response message in response to the request message from the PCD.

The request message and the response message may be used in the embodiments described above in connection with FIGS. 10 to 13.

Specifically, the request message packet 1910 may consist of an Advertising Channel Packet header field, a Requester Address field, an AdvAdd field, a Control field, a Control Data field, and a Requesting Interval field.

The Advertising Channel Packet header field may be the same in meaning and structure as the header of the common packet described above in connection with FIG. 14.

The Requester Address field includes the address information of the PCD, and the AdvAdd field includes the address information of the PHD.

The Control field may include a specific purpose when the request message packet 1910 is used for the specific purpose, and the Control data field may includes data for the purpose of using the request message packet 1910.

The Requesting Interval field may include time information when the PCD desires to receive a data packet from the PHD. Not only may this be used for the PHD to receive the data packet within a shorter time than the transmission time of data packet sent from the PHD through a common packet to the PCD, but may also be used even when the PHD does not provide the PCD with transmission time information of data packet by sending common packets to the PCD in unicast mode.

The response message packet 1920 may consist of an Advertising Channel Packet header field, a Requester Address field, an AdvAdd field, a Control field, and a BroadCast Data field.

The Advertising Channel Packet header field, the Requester Address field, the AdvAdd field, and the Control field are the same as the fields contained in the request message packet 1910, and the BroadCast Data field may contain information for transmission of data packet.

The BroadCast Data field may consist of a Bcst interval field, a Bcst Channel field, a Mode field, a Bcst TxPower field, a Clock Accuracy field, a PageID field, and a Determined Interval field.

The other fields than the Determined Interval field in the BroadCast Data field are the same as those described above in connection with FIG. 14.

The Determined Interval field may include transmission time information of a data packet for location calculation determined by the PHD for the transmission time of data packet in order for location calculation whose request has been transmitted from the PCD to the PHD through the request message.

The transmission time information may indicate random time that is the same or shorter than the transmission time of data packet for location calculation whose request has been sent from the PCD to the PHD through the request message packet 1910.

The Determined Interval field and the Bcst Interval field both have been contained in the response message packet 1920 considering compatibility with other PCDs—for example, the PHD may in some cases send the data packet to other PCDs as well as the PCD.

That is, when receiving the request message for transmission of data packet from the PCD, the PHD sends the response message to the PCD and then shifts to broadcast mode so that the PHD may send common packets to the PCD and other PCDs through the advertising channel.

In such case, the PHD may send the data packet to other PCDs as well as the PCD.

Although the present invention has been shown and described in connection with embodiments thereof, it will be understood that various changes in form and detail may be made thereto without departing from the scope of the present invention defined by the following claims.

The invention claimed is:

1. A method for calculating a location of an electronic device, the method comprising:
   receiving a common packet from a host device,
   wherein the common packet includes at least one of a time information or frequency related information through which a data packet is transmitted;
   receiving the data packet based on information included in the common packet from the host device,
   wherein the data packet is received through a data channel and includes a location related information, and antenna array information of the host device;
   obtaining angle information indicating a location relation with the host device using the antenna array information; and
   calculating the location of the electronic device based on the angle information and the location related information,
   wherein the data channel is determined based on the common packet, and
   wherein the location related information includes at least one of longitude, latitude or an altitude of the host device.

2. The method of claim 1,
   wherein the data packet is transmitted through multiple antennas of the host device.

3. The method of claim 1, further comprising:
   measuring a received signal strength of the data packet,
   wherein the received data packet includes a transmitted signal strength of the data packet, and
   wherein the location of the electronic device is calculated based on at least one of the angle information, the received signal strength or the transmitted signal strength.

4. An electronic device for calculating a location of the electronic device, the electronic device comprising:
   a communication unit configured to receive a common packet from a host device and receive a data packet based on information included in the common packet,
   wherein the common packet includes at least one of a time information or frequency related information through which a data packet is transmitted, and
   wherein the data packet is received through a data channel and includes location related information, and antenna array information of the host device; and
   a controller configured to obtain angle information indicating a location relation with the host device using the antenna array information, and calculate the location of the device based on the angle information and the location related information,
   wherein the data channel is determined based on the common packet, and
   wherein the location related information includes at least one of longitude, latitude or an altitude of the host device.

5. The electronic device of claim 4,
wherein the data packet is transmitted through multiple antennas of the host device.

6. The electronic device of claim 4, further comprising:
a signal measurement configured to measure a received signal strength of the received data packet,
wherein the received data packet includes a transmitted signal strength of the data packet, and
wherein the controller calculates the location of the electronic device based on at least one of the angle information, the received signal strength or the transmitted signal strength.

7. A method for calculating a location of an electronic device, the method comprising:
receiving a common packet from a host device,
wherein the common packet includes location related information and antenna array information of the host device;
obtaining angle information indicating a location relation with the host device using the antenna array information; and
calculating the location of the electronic device based on the obtained angle information and the location related information,
wherein the location related information includes at least one of longitude, latitude or an altitude of the host device.

8. An electronic device for calculating a location of the electronic device, the electronic device comprising:
a communication unit configured to receive a common packet from a host device,
wherein the common packet includes location related information and antenna array information of the host device; and
a controller configured to obtain angle information indicating a location relation with the host device using the antenna array information, and calculate the location of the electronic device based on the obtained angle information and the location relation information,
wherein the location related information includes at least one of longitude, latitude or an altitude of the host device.

9. The method of claim 1, further comprising:
determining whether to receive the data packet based on the location-related information.

10. The method of claim 1, further comprising:
transmitting a request message requesting transmission of the data packet,
wherein the request message includes first transmission time information indicating a time to receive the data packet.

11. The method of claim 10, further comprising:
receiving a response message in response to the request message,
wherein the response message includes second transmission time information determined based on the transmission time information, and
wherein the data packet is transmitted based on the second transmission time information.

\* \* \* \* \*